United States Patent
Waddell

(10) Patent No.: US 11,155,984 B2
(45) Date of Patent: *Oct. 26, 2021

(54) MULTIPURPOSE FAUCET TO RELEASE A WATER STREAM IN TWO DIRECTIONS

(71) Applicant: NASONI, LLC, Suffolk, VA (US)

(72) Inventor: John Steven Waddell, Suffolk, VA (US)

(73) Assignee: NASONI, LLC, Suffolk, VA (US)

( * ) Notice: Subject to any disclaimer, the term of this patent is extended or adjusted under 35 U.S.C. 154(b) by 219 days.

This patent is subject to a terminal disclaimer.

(21) Appl. No.: 16/459,062

(22) Filed: Jul. 1, 2019

(65) Prior Publication Data

US 2019/0345699 A1 Nov. 14, 2019

Related U.S. Application Data

(63) Continuation of application No. 15/693,834, filed on Sep. 1, 2017, now Pat. No. 10,378,190.

(51) Int. Cl.
*E03C 1/04* (2006.01)
*F16K 5/04* (2006.01)
(Continued)

(52) U.S. Cl.
CPC .......... *E03C 1/0405* (2013.01); *E03C 1/0404* (2013.01); *F16K 5/0407* (2013.01);
(Continued)

(58) Field of Classification Search
CPC .... E03C 1/023; E03C 1/0405; E03C 2201/30; Y10T 137/86863; F16K 5/0407;
(Continued)

(56) References Cited

U.S. PATENT DOCUMENTS 2,524,956 A 10/1950 Brunetti
2,635,006 A 4/1953 Richmond
(Continued)

FOREIGN PATENT DOCUMENTS

DE 202005020483 U1 5/2006
EP 0 787 863 A1 8/1997

OTHER PUBLICATIONS

Communication Pursuant to Rules 161(1) and 162 EPC, Application No. 18773314.2, dated Apr. 8, 2020, 3 pages.
(Continued)

*Primary Examiner* — Tuongminh N Pham
(74) *Attorney, Agent, or Firm* — Daylight Law, P.C.

(57) ABSTRACT

A faucet includes a faucet pipe, a branch pipe, a fountain valve, and a fountain nozzle with a pressure compensating flow regulator, the faucet pipe having a proximal end to release a water stream in a downward direction through a lower channel and a branch pipe disposed within the faucet pipe to release the water stream in an upward direction through the fountain nozzle, with the fountain valve configured within the proximal end of the faucet pipe to redirect the water stream to the branch pipe by gradually blocking and unblocking the upper channel of the branch pipe, and wherein the pressure compensating flow regulator is disposed with the fountain opening to compensate the pressure of the water stream released from the fountain opening and control the trajectory of the water stream discharged from the fountain opening.

13 Claims, 6 Drawing Sheets

(51) Int. Cl.
*F16K 31/60* (2006.01)
*E03B 9/20* (2006.01)
*F16K 24/06* (2006.01)

(52) U.S. Cl.
CPC .............. *F16K 31/602* (2013.01); *E03B 9/20* (2013.01); *E03C 2201/30* (2013.01); *F16K 24/06* (2013.01)

(58) Field of Classification Search
CPC ...... F16K 31/602; F16K 24/06; F16K 5/0221; F16K 5/0421; F16K 5/0428
See application file for complete search history.

(56) References Cited

U.S. PATENT DOCUMENTS

| | | |
|---|---|---|
| 2,878,059 A | 3/1959 | Limle |
| 3,079,088 A | 2/1963 | Hermann et al. |
| 3,133,701 A | 5/1964 | McClenahan |
| 3,265,307 A | 8/1966 | Slater, Jr. |
| 3,325,101 A | 6/1967 | Cuschera |
| 3,462,080 A | 8/1969 | Howard et al. |
| 3,512,711 A | 5/1970 | Abbott |
| 4,552,306 A | 11/1985 | Litwak et al. |
| 4,991,775 A | 2/1991 | Huber et al. |
| D347,760 S | 6/1994 | Breeze |
| 5,775,587 A | 7/1998 | Davis |
| 6,805,151 B1* | 10/2004 | Chang ................ F16K 11/0743 137/270 |
| 7,090,144 B2 | 8/2006 | Gross et al. |
| 8,397,743 B2 | 3/2013 | Hawkins et al. |
| 8,695,638 B2 | 4/2014 | DiNunzio |
| 2003/0132306 A1 | 7/2003 | Chiu et al. |
| 2005/0098650 A1* | 5/2005 | Gross ....................... E03B 9/20 239/24 |
| 2006/0101570 A1 | 5/2006 | Kunkel |
| 2008/0142101 A1 | 6/2008 | Lin et al. |
| 2011/0233296 A1 | 9/2011 | Stude |
| 2011/0290901 A1* | 12/2011 | Dittman, III .............. E03B 9/20 239/24 |

OTHER PUBLICATIONS

Notification Concerning Transmittal of the International Preliminary Report on Patentability (Chapter I of the Patent Cooperation Treaty), International Preliminary Report on Patentability, Written Opinion of the ISR, dated Mar. 12, 2020 for International Application No. PCT/US2018/048948; 10 Pages.
Notification of Transmittal of the International Search Report and Written Opinion of the ISA dated Dec. 12, 2018 for International Application No. PCT/US2018/048948; 1 Page.
International Search Report dated Dec. 12, 2018 for International Application No. PCT/US2018/048948; 5 Pages.
Written Opinion of the ISA dated Dec. 12, 2018 for International Application No. PCT/US2018/048948; 10 Pages.

* cited by examiner

MULTIPURPOSE FAUCET TO RELEASE A WATER STREAM IN TWO DIRECTIONS

CROSS REFERENCE TO RELATED APPLICATION

This Application is a continuation of prior application Ser. No. 15/693,834, filed Sep. 1, 2017, which application is hereby incorporated herein by reference in its entirety.

FIELD OF THE INVENTION

The present invention is generally related to a faucet and more particularly to a faucet for releasing a water stream in two different directions.

BACKGROUND

Conventionally, a faucet includes a hot water knob and a cold water knob which can be used to control the flow of water through the faucet which is utilized for hand washing, face washing or utensil cleaning. However, the existing faucets are inconvenient to use for purposes other than conventional hand washing, unhygienic, and result into wasting a large amount of water.

Thus, in view of the above, there is a long-felt need in the industry to address the aforementioned deficiencies and inadequacies.

SUMMARY OF THE INVENTION

In accordance with the present disclosure, a faucet is provided comprising: a faucet pipe having a free end to dispense water for utilitarian purposes; a branch channel disposed within the faucet pipe having a fountain opening to enable a user to drink water directly from a water stream discharged from the fountain opening when the water stream is directed through the branch channel and fountain opening; a fountain valve for blocking and unblocking an opening to the branch channel to direct the water stream to the branch channel and to the free end of the faucet pipe to control the water stream discharged from the free end of the faucet and the water stream entering the branch channel; and a fountain nozzle disposed with the fountain opening to reduce the water pressure of the water stream discharged from the fountain opening and control the trajectory of the water stream discharged from the fountain opening. With such an arrangement, a faucet to release a water stream in two directions is provided.

According to the embodiments illustrated herein, a faucet to release a water stream in two directions is provided. The faucet includes a faucet pipe, a branch pipe, a fountain valve, and a fountain nozzle with a pressure compensating flow regulator, the faucet pipe having a proximal end to release a water stream in a downward direction through a lower channel and a branch pipe disposed within the faucet pipe to release the water stream in an upward direction through the fountain nozzle with the fountain valve configured within the proximal end of the faucet pipe to redirect the water stream to the branch pipe by gradually blocking and unblocking the upper channel of the branch pipe and wherein the pressure compensating flow regulator is disposed with the fountain opening to compensate the pressure of the water stream released from the fountain opening and control the trajectory of the water stream discharged from the fountain.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

Like reference symbols in the various drawings indicate like elements.

DETAILED DESCRIPTION

Figure 1:
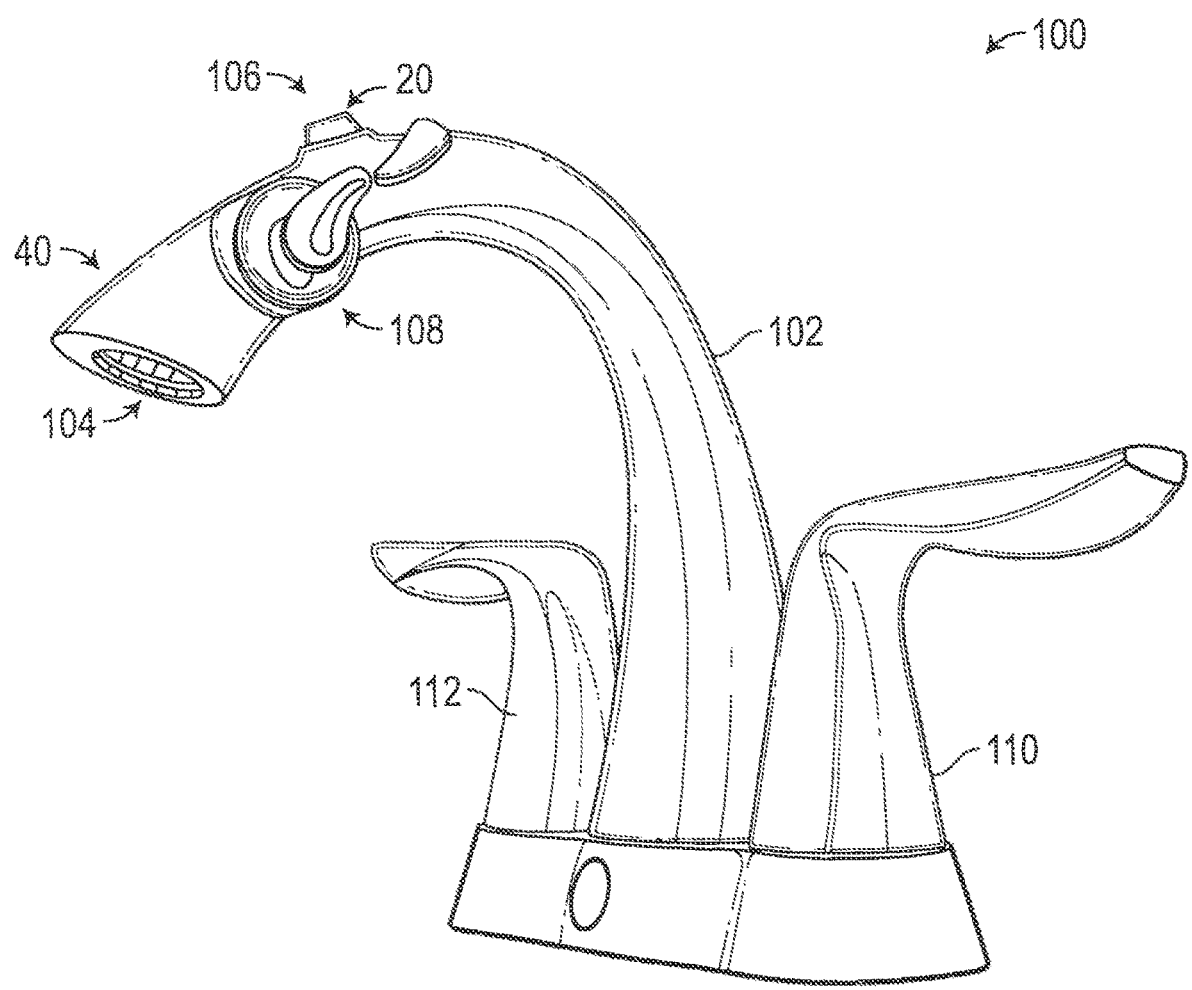
FIG. 1 illustrates a perspective view of a multipurpose faucet in accordance with the disclosure.

Referring now to FIG. 1, a perspective view of a multipurpose faucet 100 (also referred to as faucet 100) is shown to include a faucet pipe 102 with a cold water valve 110 and a hot water valve 112 disposed at a distal end of the faucet pipe 102. The latter are found in conventional water faucets and will not be discussed in detail. The faucet 100 further includes a fountain nozzle 20 and a fountain valve 108 which, when in an off position releases water though an opening 104 at a proximal end of the faucet pipe 102 and when in an on position releases water using the fountain nozzle 20 through a fountain nozzle opening 106 as to be described further.

Figure 2:
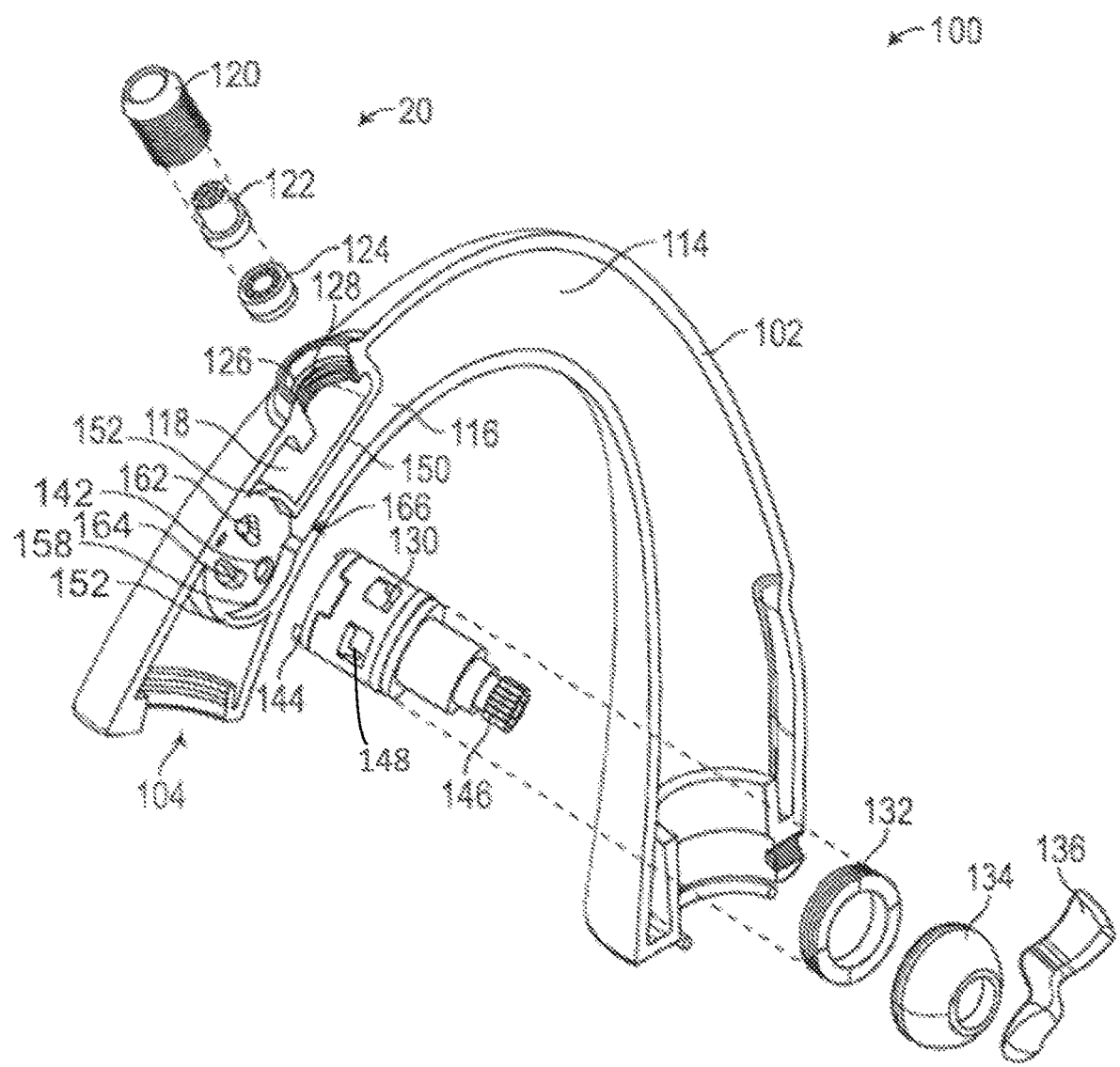
FIG. 2 illustrates a sectional view of the multipurpose faucet in accordance with the disclosure.
Figure 3A:
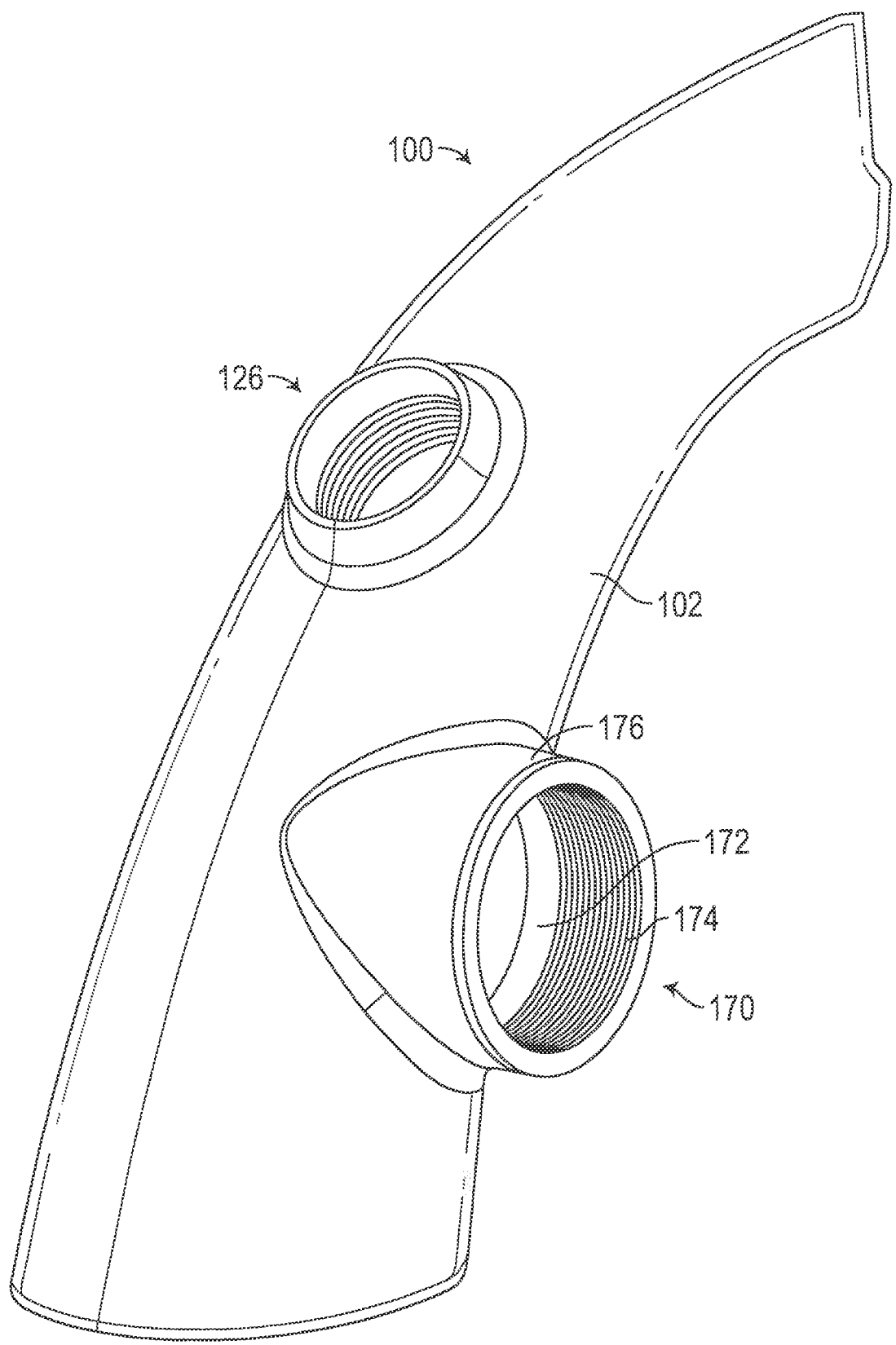
FIG. 3A illustrates a perspective view of the multipurpose faucet before a fountain nozzle and a rotary valve are attached.

Referring now also to FIG. 2, a sectional view of the faucet 100 is shown with the various details of the faucet 100. The faucet pipe 102 has an inner channel 114 that narrows to a lower channel 116. The faucet pipe 102 also includes an upper channel 118 that is separated from the lower channel 116 by a channel wall 150. An opening 162 is disposed at a proximal end of the upper channel 118 and an opening 126 is disposed at a distal end of the upper channel 118. A proximal end of the lower channel 116 connects to the fountain valve 108 through opening 166 in a casting 152. The fountain valve 108 includes a rotary valve 130 with a stem 146 and openings 148 in the side walls of the rotary valve 130. The rotary valve 130 is disposed within the side walls 158 of the casting 152. The rotary valve 130 further includes two pins 144 which mate with holes 142 to prevent the base of rotary valve 130 from rotating when the stem 146 is moved. Referring now also to FIG. 3A, a fountain valve opening 170 in the faucet 100 accommodates the rotary valve 130 and when the rotary valve 130 is inserted into fountain valve opening 170, the rotary valve 130 is set so that pins 144 are inserted into holes 142. The fountain valve opening 170 includes an external wall 176 with an inner wall 172 having threads 174 formed on the inner wall 172. To secure the rotary valve 130 in the fountain valve opening 170, a threaded end cap 132 is screwed into the fountain valve opening 170 with the threads 174 mating with the threads of the threaded end cap 132. A cover 134 having threads to mate with the threads 174 is disposed over the threaded end cap 132 by screwing the cover 134 into the fountain valve opening 170. A fountain valve handle 136 is mated with the stem 146 so that a user can open and close the fountain valve 108.

To provide the fountain nozzle 20, a fountain housing 120 includes a fountain aerator 122 and a pressure compensating flow regulator 124 disposed within the fountain housing 120. The fountain housing 120 includes threads provided on the exterior wall of the fountain housing 120 which mate with the threads 128 in the fountain housing opening 126 to secure the fountain nozzle 20 to the fountain housing opening 126. To fabricate the fountain nozzle 20, the fountain aerator 122 is placed in the fountain housing 120 and then the pressure compensating flow regulator 124 is pressed fit into the fountain housing 120. The fountain aerator 122 is a typical aerator selected for this particular application. The pressure compensating flow regulator 124 is selected to provide a suitable arch of water exiting the fountain nozzle opening 106 and for example a MR05 US type manufactured by Neoperl can be used. The angle of the fountain nozzle 20 is set to ensure the trajectory of a fountain arc, in combination with the pressure compensating flow regulator 124, provides a suitable fountain arc for drinking from without overshooting a sink. With the pressure reducing flow regulator 124 sitting below the fountain aerator 122 which controls the flow pressure, a consistent flow of water through the fountain nozzle 20 results in a consistent fountain height.

It should now be appreciated in accordance with the present disclosure, a faucet is provided including a faucet pipe having a free end to dispense water for utilitarian purposes, a branch channel disposed within the faucet pipe having a fountain opening to enable a user to drink water directly from a water stream discharged from the fountain opening when the water stream is directed through the branch channel and fountain opening, a fountain valve for blocking and unblocking an opening to the branch channel to direct the water stream to the branch channel and to the free end of the faucet pipe to control the water stream discharged from the free end of the faucet and the water stream entering the branch channel and a fountain nozzle disposed with the fountain opening to reduce the water pressure of the water stream discharged from the fountain opening and control the trajectory of the water stream discharged from the fountain opening.

Figure 5:
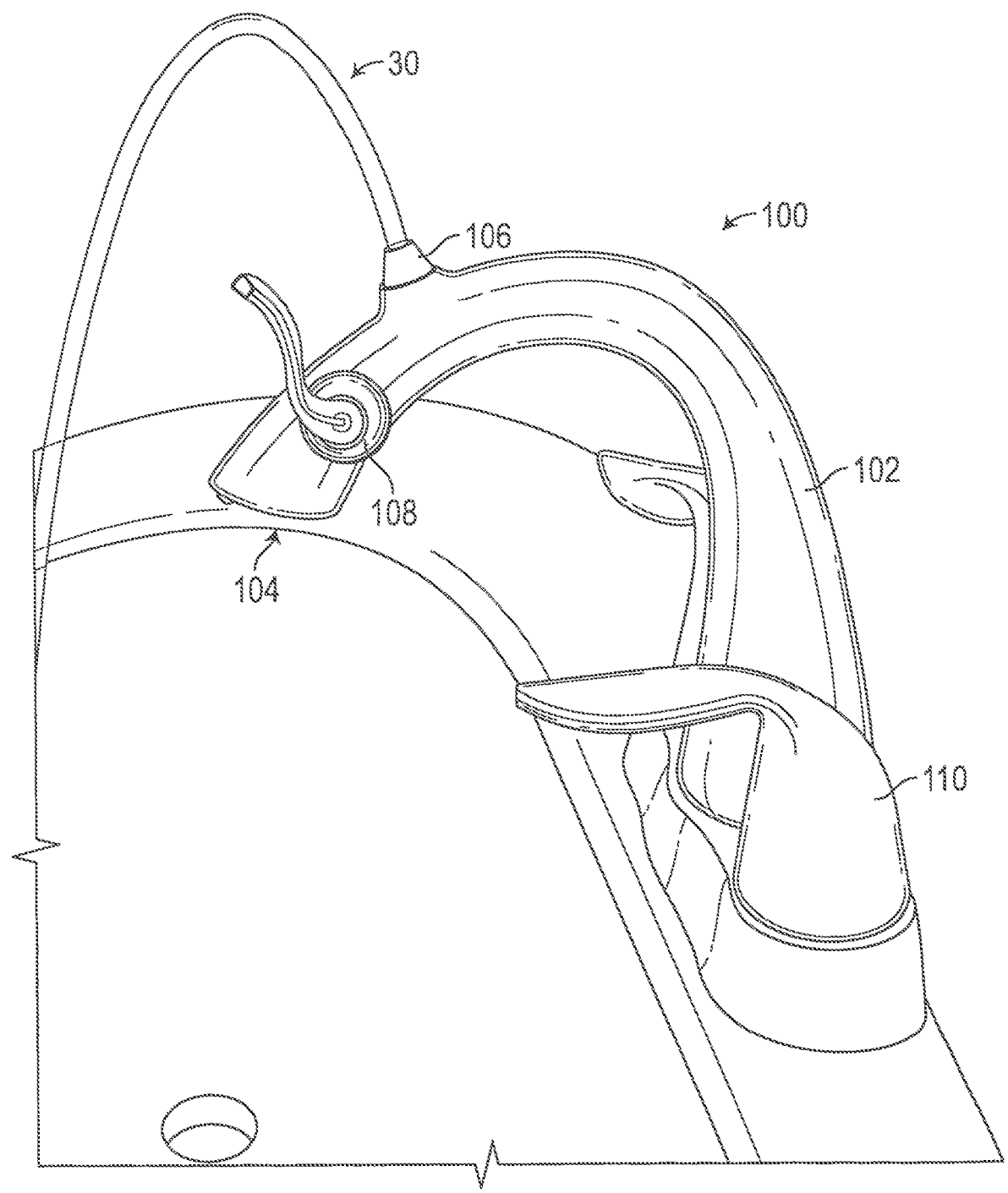
FIG. 5 illustrates an operational view of the multipurpose faucet as a water fountain with the proximal end blocked in accordance with the disclosure.

Having described the details of the faucet 100, a description of the operation of the faucet 100 will follow. The faucet 100 discharges water through opening 104 when fountain valve 108 is closed and operates similar to typical household sink faucets. Unlike typical household sink faucets, faucet 100 also provides a fountain opening 106 where a water stream 30 is provided so that a user can drink water from the water stream 30 as shown in FIG. 5. The faucet pipe 102 includes a free or proximal end 40 to release a water stream in a downward direction through the opening 104 and the branch pipe or channel 118 disposed within the faucet pipe 102 having a fountain nozzle 20 to release the water stream in an upward direction through the fountain nozzle opening 106.

Figure 3B:
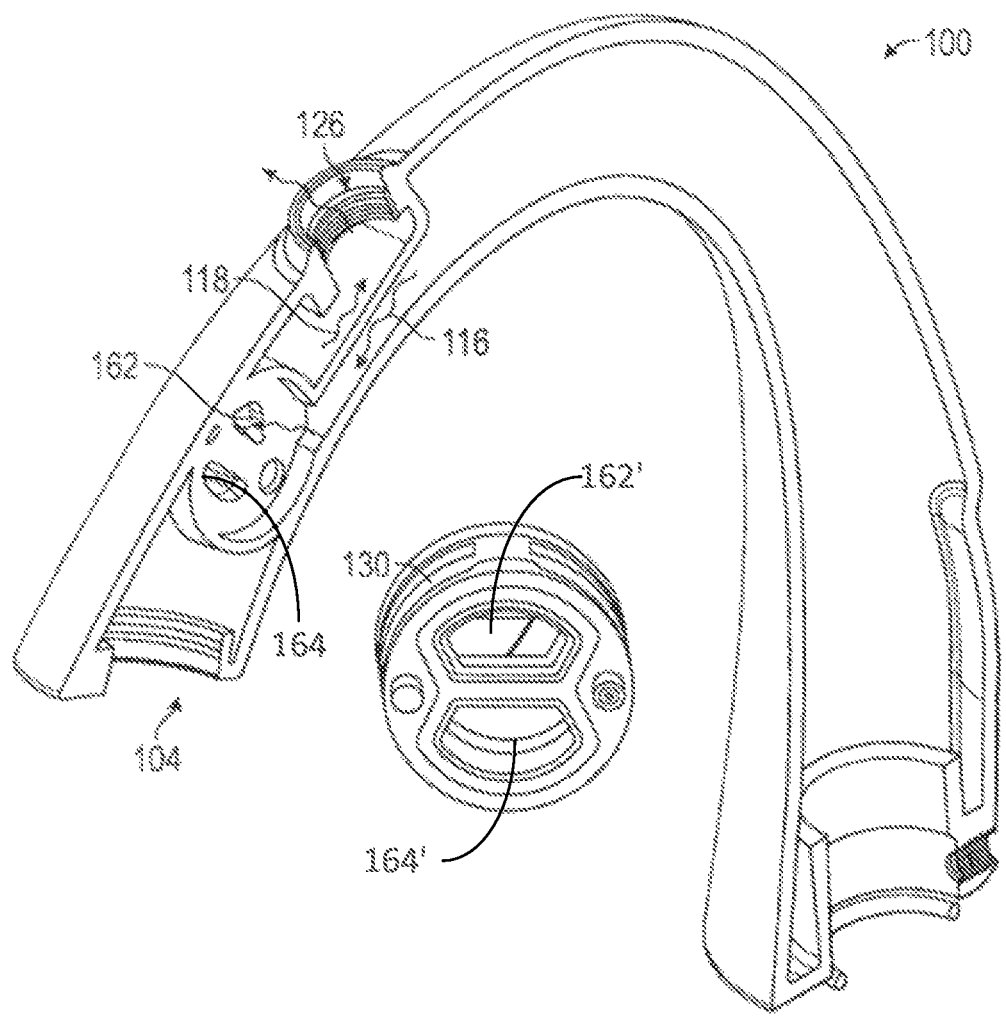
FIG. 3B illustrates a sectional view of the multipurpose faucet showing the water flow with the fountain valve in a first position to allow the water flow through a branch channel to provide a water fountain.

Referring now to FIGS. 2, 3A and 3B, the rotary valve 130 as part of the fountain valve 108 includes openings 148 in the side walls of the rotary valve 130. The rotary valve 130 also include an opening 162 and an opening 164 at the bottom of the rotary valve 130 which mate with opening 162 and opening 164, respectively. When fountain valve 108 is in the open position, opening 162 is in the open position where the opening 162 is not blocked and the water stream traveling down channel 116 flows through rotary valve 130 and out the opening 162 and through opening 162 to redirect the water stream to the upper channel 118 (shown in FIG. 3B) and out opening 126. As described above, the fountain valve 108 is a ceramic disc valve which utilizes a plurality of fire-hardened ceramic discs such as a movable upper ceramic disc, and a fixed lower ceramic disc. The movable upper disc and the fixed lower disc move against each other in a shearing action to block the water stream, or allow the water stream to pass through the opening in fountain valve 108. As shown in FIG. 3B, in the open position, the opening 162 is open and not blocked and the opening 164 is blocked so the water does not flow to opening 164.

Figure 4:
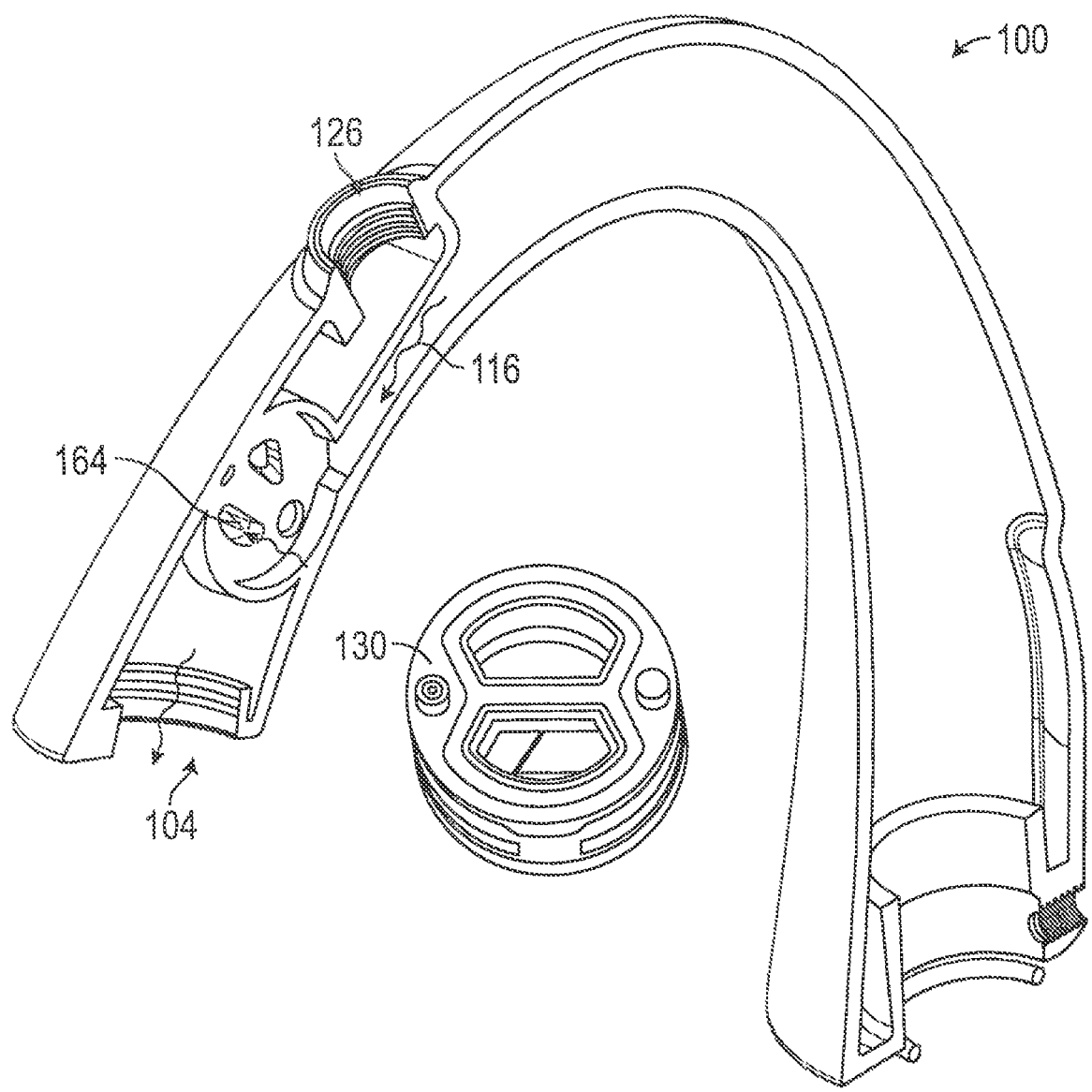
FIG. 4 illustrates a sectional view of the multipurpose faucet showing the water flow with the fountain valve in a second position to allow the water flow through the exit channel.

Referring now to FIGS. 2 and 4, when fountain valve 108 is in the closed or normal position, opening 162 is in the closed position where the opening 162 is blocked. Instead, opening 164 is in the open position where the opening 164 is not blocked and the water stream traveling down channel 116 flows through rotary valve 130 and out the opening 164 and through opening 164 to redirect the water stream toward the opening 104 (shown in FIG. 4) and out opening 104. The water stream will also flow through the sides of rotary valve 130 from one side to the other through the rotary valve 130.

In the shown embodiment, the faucet pipe 102 includes a casting 152 engineered to house the rotary valve 130 that releases the water stream in the downward direction or block the water stream to redirect it to the fountain opening depending upon it's open or closed position.

The pressure compensating flow regulator 124 is disposed with the fountain nozzle 20 to compensate the pressure of the water stream released from the fountain aerator 122 and control the trajectory of the water stream discharged from the fountain nozzle 20. In an embodiment, the pressure compensating flow regulator 124 operates as a flexible orifice to ensure a predefined constant flow rate is maintained independent of the prevailing water line pressure.

In an embodiment, the branch pipe 102 includes a housing around the rotary valve 130, here a ceramic disc valve, to redirect the water stream when a water stream is required in the upward direction. The branch pipe 102 further directs the water stream in the downward direction, by bypassing the fountain nozzle 20 entirely, to eliminate the need for a mechanism to prevent the water stream from exiting the fountain opening.

FIG. 2 illustrates a sectional view of the faucet 100, in accordance with at least one embodiment. The sectional view of the faucet 100 shows the branch pipe 118 (also referred to as the upper channel 118), the ceramic disc valve 130 (also referred to as rotary valve 130), the pressure compensating flow regulator 124, and a fountain aerator 122. The ceramic disk valve 130 gradually blocks and unblocks the end 10 of the faucet pipe 102 to control the water stream discharged from the end 104 of the faucet pipe 102 and the water stream entering to the branch pipe 118, In operation, when the faucet 100 is in normal operation, the faucet 100 functions as a normal water faucet. In an embodiment, a lever 136 is attached to the ceramic disk valve 130.

When the lever rotates ¼ turn, the water no longer discharges from the downspout aerator with opening 104 (shown in FIG. 3B) and the water stream is rerouted to the fountain aerator 122 to create the water fountain effect. In an exemplary embodiment, the fountain aerator 122 configured with the pressure compensating flow regulator 124 has a flow rate of 0.5 GPM (Gallons per Minute). The fountain aerator 122 is a low flow faucet aerator well suited for bathrooms, washing hands or face and rinsing after brushing one's teeth. In comparison to standard 2.2 GPM fountain aerators when using the faucet in normal faucet operating use, the 0.5 GPM aerator reduces the water flow rate by 77%. However, the present fountain aerator 122 can utilize various pressure compensating flow regulators 124 to compensate for various water pressures. For example, in case of normal water pressure, the present faucet can utilizes a 0.5 GPM pressure reducer, and in case of higher water pressure, a 1.4 GPM pressure compensating flow regulator 124 can be utilized for a higher fountain arc or to maintain a certain fountain arc height under greater pressure.

FIG. 5 illustrates a view of the multipurpose faucet with a blocked proximal end to create a water fountain, in accordance with at least one embodiment. If the fountain valve 108 is not completely (less than 100%) opened or closed, then the water steam passes through both the fountain nozzle opening 106 and the downspout aerator opening 104. For example, if the fountain knob 108 rotates 50%, then half the water stream passes through the fountain 106 and half the water stream passes through the downspout aerator opening 104. The arrows (FIG. 3B) and (FIG. 4) show the directions of the water flow. The water stream travels through a lower channel 116 toward the downspout aerator opening 104 when operating as a general faucet, and when the lever is rotated, the water stream is re-routed through an upper channel 118 to the fountain opening 106. This mechanism provides sufficient water pressure to pass through the fountain opening 106. However, the present faucet 100 utilizes a pressure compensating flow regulator 124 that has a pressure reducing capability in the fountain nozzle 20, which thereby reduces the water pressure as needed and generates a consistent height water fountain at the same time.

FIG. 5 illustrates an operational view of the faucet 100, in accordance with at least one embodiment. The operation view of the present faucet shows the water stream flows in upward direction as a fountain 30 through the fountain opening 106. The fountain capability of the present faucet 100 is convenient for rinsing after brushing one's teeth, drinking water, rinsing one's face, and even to serve as an emergency home eyewash station. By eliminating the need for using a drinking cup that may be dirty or one's hand to obtain water for rinsing or drinking, the present invention provides a hygienic multi-purpose fountain faucet.

No language in the specification should be construed as indicating any non-claimed element as essential to the practice of the invention.

A number of embodiments of the disclosure have been described. Nevertheless, it will be understood that various modifications may be made without departing from the spirit and scope of the disclosure.

Accordingly, other embodiments are within the scope of the following claims.

The invention claimed is:

1. A
faucet pipe having a fountain housing opening and a free end opening, the faucet pipe comprising:
an inner channel;
a primary channel aligned with and located in the inner channel;
a fountain channel aligned with and located in the inner channel, wherein the fountain channel has a first opening disposed at a first end and a second opening disposed at a second end, and wherein the second opening provides the fountain housing opening;
a channel wall formed by a casting, wherein the channel wall defines the fountain channel;
a fountain valve disposed within of the casting, the fountain valve connecting the primary channel with the fountain channel and blocking the free end opening of the faucet pipe in a first position, and connecting the primary channel with the free end opening of the faucet pipe and blocking the fountain channel in a second position; and
a fountain nozzle disposed within the fountain housing opening, the fountain nozzle adapted to provide a fountain arc.

2. The faucet pipe of claim 1 wherein the fountain valve comprises:
a rotary valve with a base and a stem and openings inside walls of the base of the rotary valve; and
the rotary valve mated with the casting to control a flow of water through the fountain valve when the stem is rotated.

3. The faucet pipe of claim 2 wherein the fountain valve comprises:
two pins disposed on the rotary valve which mate with holes in the casting to prevent the base of rotary valve from rotating when the stem is moved.

4. The faucet pipe of claim 2 wherein the fountain valve is horizontal.

5. The faucet pipe of claim 1 wherein the fountain channel comprises:
a channel disposed within the faucet pipe to control water flow from the fountain valve to the fountain nozzle.

6. A multipurpose faucet to release a water stream in two directions, the faucet comprising:
a faucet pipe having a proximal end to release the water stream;
a branch pipe having a primary channel aligned with and located in a primary channel of the faucet pipe, a fountain channel aligned with and located in the primary channel of the faucet pipe, a first opening to receive the water stream, and a second opening to provide a fountain opening to release the water stream;
a channel wall formed by a casting, wherein the channel wall defines the fountain channel;
a fountain valve to: (i) redirect the water stream to the fountain opening by blocking the proximal end of the faucet pipe and unblocking the fountain channel of the branch pipe; and (ii) redirect the water stream to the proximal end of the faucet pipe by blocking the fountain channel of the branch pipe and unblocking the proximal end of the faucet pipe; and
a fountain aerator and a pressure compensating flow regulator disposed within the fountain opening.

7. The faucet according to claim 6, wherein the fountain valve comprises a ceramic disc valve which utilizes a plurality of fire-hardened ceramic discs including a movable upper ceramic disc and a fixed lower ceramic disc.

8. The faucet according to claim 7, wherein the movable upper disc and the fixed lower disc move against each other in a shearing action to block and unblock the proximal end of the faucet pipe.

9. The faucet according to claim 6, wherein:
the casting mates around the fountain valve;
the fountain valve is a ceramic disc valve; and
the casting includes an open end engineered to house the ceramic disc valve.

10. The faucet according to claim 6 wherein:

the branch pipe comprises a housing around the fountain valve; and the fountain valve is a ceramic disc valve.

11. The faucet according to claim 10 wherein the fountain valve directs the water stream in a downward direction through the primary channel by bypassing the fountain channel entirely to eliminate the need for a mechanism to prevent the water stream from exiting the fountain opening.

12. The faucet according to claim 6 wherein an angle of the fountain aerator is provided to ensure, in combination with the pressure compensating flow regulator, a fountain arc.

13. A faucet comprising:

a faucet pipe having a fountain housing opening and a free end opening, the faucet pipe comprising:

an inner channel;

a primary channel aligned with and located in the inner channel;

a fountain channel aligned with and located in the inner channel, wherein the fountain channel has a first opening disposed at a first end and a second opening disposed at a second end, and wherein the second opening provides the fountain housing opening;

a channel wall formed by a casting, wherein the channel wall defines the fountain channel;

a fountain valve disposed within the casting, the fountain valve connecting the primary channel with the fountain channel and blocking the free end opening of the faucet pipe in a first position, and connecting the primary channel with the free end opening of the faucet pipe and blocking the fountain channel in a second position; and a fountain nozzle disposed within the fountain housing opening and adapted to provide a fountain arc.

* * * * *

UNITED STATES PATENT AND TRADEMARK OFFICE
CERTIFICATE OF CORRECTION

PATENT NO. : 11,155,984 B2
APPLICATION NO. : 16/459062
DATED : October 26, 2021
INVENTOR(S) : John Steven Waddell Page 1 of 1

It is certified that error appears in the above-identified patent and that said Letters Patent is hereby corrected as shown below:

In the Claims

Column 6, Line 26, please insert --the-- before "rotary".

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*